Figure 1:
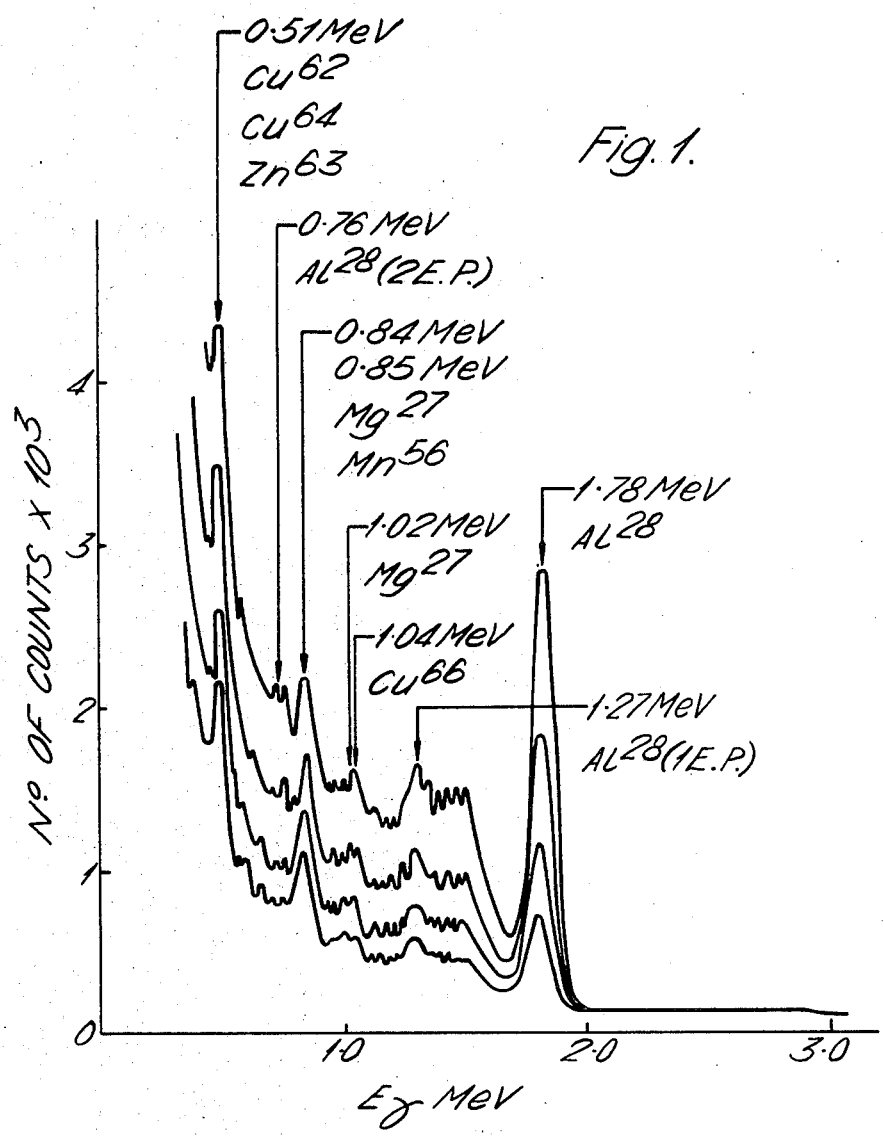

United States Patent [19]
Wylie et al.

[11] 3,792,253
[45] Feb. 12, 1974

[54] METHOD AND APPARATUS FOR DETECTION OF COPPER

[75] Inventors: Alan Wilson Wylie, Nunawading; Peter Lewis Eisler, East Hawthorn; Paul Huppert, North Balwyn, all of Australia

[73] Assignee: Commonwealth Scientific and Industrial Research Organization, Campbell, Australia

[22] Filed: Sept. 23, 1971

[21] Appl. No.: 183,213

[30] Foreign Application Priority Data
Nov. 18, 1970  Australia............................ 3236/70
Sept. 24, 1970  Australia............................ 2447/70

[52] U.S. Cl.... 250/83.3 R, 250/83 SA, 250/83.6 W
[51] Int. Cl.............................................. G01t 1/18
[58] Field of Search..... 250/83.6 W, 108 R, 83.3 R, 250/83.5 A

[56] References Cited
UNITED STATES PATENTS
2,996,618  8/1961  Goodman et al............. 250/83.6 W
3,463,922  8/1969  Senftle et al.................... 250/83.3 R
3,240,937  3/1966  McKay........................... 250/83.3 R
3,146,349  8/1964  Jordan............................ 250/83.3 R
2,508,772  5/1950  Pontecorvo.................... 250/83.6 W
2,220,509  11/1940 Brons............................. 250/83.6 W
3,562,526  2/1971  Lawson............................... 250/108
3,280,329  10/1966 Harmer........................... 250/108 R

*Primary Examiner*—Harold A. Dixon
*Attorney, Agent, or Firm*—Sughrue, Rothwell, Mion, Zinn & Macpeak

[57] ABSTRACT

A method and apparatus for the detection and estimation of copper in an ore body which involves irradiation of the body with a flux of fast neutrons to convert $Cu^{63}$ to $Cu^{62}$; and detection and measurement of the 0.511 MeV peak in the gamma radiation emitted by the body due to the $Cu^{62}$.

A double-shielded detector for monitoring neutron fluxes is also disclosed.

15 Claims, 2 Drawing Figures

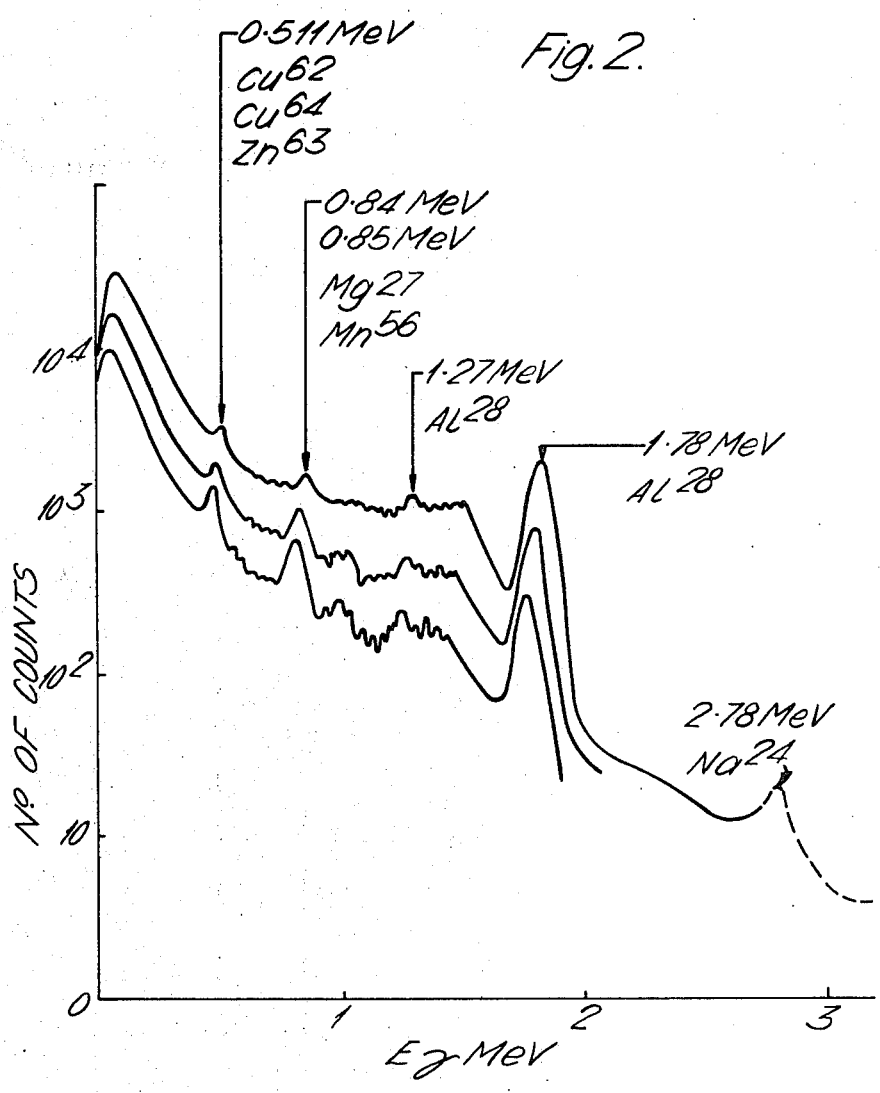

METHOD AND APPARATUS FOR DETECTION OF COPPER

This invention relates to a method and apparatus for detecting and estimating copper present in a body and has particular application in detecting and estimating copper present in prospecting boreholes.

The need for instrumental methods of "logging" element occurrence in boreholes drilled by the newer and cheaper percussion techniques has been discussed previously by two of the present inventors (Wylie and Eisler, 1969 — Prospecting with Neutrons, Philips Tech. Rev., 30, (4): 97–105) and it has been proposed that gamma radiation is the most generally useful carrier of information about ore composition.

Carefully obtained logging results would intrinsically provide a truer reflection of copper concentration in ores than core analyses; as the latter pertain only to what corresponds, in neutron-based logging methods, to a small fraction of the "kernel" of copper-bearing rock reached by neutrons and responsible for the gamma radiation of copper. Moreover, only in a completely homogeneous rock matrix of adequate size will the response from the logging tool, and the coring result, have the same meaning. In addition, it has been pointed out (Lobanov, E. M., Novikov, A. P., Nikanorov, G. S., Romanov, O. M. and Khaidarov, A.A. — Mining and Minerals Eng., July, 1966, 261–264, and August, 1966, 303–308) that the more uneven the copper distribution, the greater the advantage of the logging process.

Previous work on detection of copper in bore-holes, carried out in the Soviet Union, by Lobanov et al., involved the excitation of copper radiation with a 20 C Po/Be neutron source, and isolation of the 1.05 MeV radiation of $Cu^{66}$ ($T_{1/2}$ 5.1 min.) in a 50 KeV spectral window. The concentration of copper was calculated by resolution into its components of the composite decay curve of a mixture of $Cu^{66}$ and $Al^{28}$, after subtraction of long-lived back-ground due to $Na^{24}$ and $K^{42}$. The ores investigated were of the prophyry type, and were of relatively low iron content. The results of tests on ores containing up to 0.6 per cent copper showed a mean deviation of about 16 per cent from the chemical analyses of the corresponding cores.

A method somewhat similar to that of Lobanov et al, based on activation of copper and measurement of $Cu^{66}$ radiation, has also been proposed.

The great disadvantage of using $Cu^{66}$ radiation at 1.05 MeV is the poor sensitivity due to a low (9 per cent) absolute line intensity. Moreover, $Cu^{66}$ is derived from $Cu^{65}$, itself only 31 per cent of the total copper present, so that the effective radiation intensity at 1.05 MeV is only of the order of 3 per cent, which is inadequate to detect low concentrations of copper in the presence of a high radiation background.

Highly aluminous ores (presumably of dioritic type) provide serious background interference in the use of $Cu^{66}$ activation radiation, and the method may not be applicable for sphalerite ores containing cadmium, presumably due to the high neutron absorption of that element.

Thus, there is a need for developing more sensitive and more general methods for location of copper in bore-holes, utilizing, for preference, more powerful methods of excitation than the Po/Be sources described above and/or the stimulated radiation from a copper isotope which is more abundant or which is less subject to interference by other elements.

With these objects in view we have produced a new logging method for location of copper in boreholes which involves detection of the strong annihilation peak due to $\beta+$ emission from the copper nuclides $Cu^{62}$ and $Cu^{64}$. A survey of all the elements present in significant quantities in copper ores suggests, and experiments under bore-hole conditions with appropriate equipment confirm that, with the exception of $Zn^{63}$, these two copper nuclides are the only significant emitters of gamma radiation at 0.511 MeV. The method has been shown to be suitable for quantitatively determining copper in bore-holes down to concentration levels of 0.1 per cent.

Accordingly, the present invention provides a method for the detection of copper in a body, which comprises irradiating the body with fast neutrons, thereby to bring about the transformation of $Cu^{63}$ to $Cu^{62}$, discontinuing the irradiation and detecting the 0.511 MeV gamma radiation peak due to the annihilation of positrons emitted by $Cu^{62}$.

Estimation of the copper present is carried out in accordance with the invention by measuring the 0.511 MeV gamma radiation peak mentioned above.

The method of the invention has particular application to the bore-hole logging of ore formations, when it comprises irradiating a zone of the bore-hole with fast neutrons thereby to bring about the transformation of $Cu^{63}$ to $Cu^{62}$, discontinuing irradiation of said zone and detecting and measuring the intensity of the said 0.511 MeV peak in gamma radiation emitted from said zone.

The present invention further provides apparatus for the detection and estimation of copper in a body, comprising a source of fast neutrons for irradiating the body, and means for detecting and measuring said 0.511 MeV gamma radiation peak.

More specifically, the invention provides apparatus for the detection and estimation of copper in the bore-hole logging of ore formations, comprising a source of fast neutrons arranged to irradiate a zone of the bore-hole, means for detecting and measuring the 0.511 MeV gamma radiation peak due to annihilation of positrons emitted by $Cu^{62}$ in said zone as a result of irradiation by the neutron flux.

Any suitable neutron source may be used providing it is capable of producing neutrons of the appropriate energy, at least 12 MeV, preferably 14 MeV, and intensity, preferably $10^8$ n/s or more. Radioisotope sources or source/target combinations with the necessary energies are not readily available and it is preferred, therefore, to use an accelerator tube for neutron production. This has the added advantage that the neutron flux can be controlled easily.

In bore-hole operations, interruption of the neutron irradiation can be accomplished simply by moving the source away from the zone under observation; i.e., by raising or lowering the source. Using an accelerator tube, irradiation may also be controlled by turning off the power supply to the tube. If radioisotope sources are used mechanical means, such as shutters can be used to interrupt the neutron or neutron-exciting flux.

Detection and measurement of gamma radiation may be accomplished by any suitable apparatus, with due regard to the requirements of stability and accuracy of the system, and the necessity to transmit signals over long lengths of cable. Scintillation counting devices are generally preferred at present, but the use of solid state devices is not excluded.

Counting and analysis of the signal received from the detector may be carried out using known methods and apparatus, for example, as described hereinafter.

In the preferred method of operation, using a source output of about $10^8$ neutrons/sec., irradiation is continued for about 20 minutes (approximately twice the half-life for $Cu^{62}$) and following a suitable delay, preferably about 10 minutes, to allow decay of interfering radiation, counting of the 0.511 MeV peak from $Cu^{62}$ is initiated. From the count obtained the back-ground spectral continuum is then subtracted to give a net count which is a function of the total copper present in the test formation. Conveniently, this can be achieved by feeding the detector signal to a multichannel pulse height analyser, extracting from the spectrum and measuring, the height of the peak at 0.511 MeV, and subtracting the back-ground continuum. This may be done by displaying or plotting the spectrum from the analyser and carrying out the necessary calculations by hand, or more conveniently, by use of a suitably programmed computer on-line to the analyser. Alternatively or additionally, provision may be made to record the memory content of the analyser at suitable intervals, e.g. on magnetic tape; the recorded data can then be analysed at some later stage.

From a practical viewpoint, it is also important to provide means for "normalizing" the neutron dosage to a constant factor during the logging process and means for stabilising the analyser channel settings — an important technical requirement when the spectral window must be kept constant both in position and width because of its narrowness and the proximity of neighbouring photopeaks.

Measurement of the irradiating flux is achieved often by measurement of the flux of slow "thermalized" neutrons which are scattered back to the detector after passage into the formation. Detection of these slow neutrons may be carried out with a separate neutron detector but, according to a further aspect of this invention, a gamma ray scintillation counter provided with a shield or coating containing boron may be used, particularly the $B^{10}$ isotope which on neutron irradiation gives rise to gamma radiation of 0.478 MeV (hereinafter referred to as the "$B^{10}$ peak") by the reactions:

$$B_5^{10} + n_0^1 \rightarrow Li_3^{7*} + He_2^4$$
$$Li_3^{7*} \rightarrow Li_3^7 + \gamma \ (0.478 \text{ MeV})$$

(*indicates an excited state of the $Li_3^7$ nucleus.)

The thermal neutron flux may then be measured by the intensity of the 0.478 MeV peak in the energy spectrum from the counter.

The boron also serves to shield the scintillation counter from direct irradiation by the thermal neutron flux which can give rise to undesirable radioactivity in the elements comprising the scintillator crystal and neutron capture gamma radiation within the crystal, both of which may interfere with the proper operation of the scintillator. Such use of boron ($B^{10}$) as a shield is disclosed in U.S. Pat No. 3,127,512, which also shows the use of the lithium isotope $Li^6$ as a neutron shielding material.

One difficulty encountered in the use of a boron-shielding system is that the neutron flux may be quite large resulting in a high count of 0.478 MeV gamma radiation. If the scintillation detector is input to a multi channel pulse height analyser, a considerable "pulse pile-up" effect, including "undershoot" may then occur at the input of the analyser, thus leading to broadening of peaks in the gamma spectrum with consequent loss of accuracy in interpretation.

Accordingly, this aspect of the present invention seeks to provide an improved method for shielding a gamma ray detection system and for controlling the effect of a neutron flux on such a detector, thereby enabling the simultaneous detection of both thermal neutron and gamma ray fluxes.

This is achieved by using a shield containing $Li^6$ to attenuate a neutron flux before it reaches a shield containing $B^{10}$; in this way it is possible to regulate the resultant gamma ray flux and hence avoid the difficulties mentioned above.

This arrangement also permits measurement of neutron fluxes at the location of the scintillator, i.e., the same location at which measurement of the stimulated gamma radiation flux is made.

This has obvious advantages over arrangements using separate gamma and neutron detectors whereby measurement of the neutron flux takes place at some location which is more or less remote from the location at which gamma radiation is measured and thus the measured neutron flux may not be entirely relevant to the measured gamma flux.

This type of detector is particularly suitable for the detection of "prompt" radiation.

Thus, according to this aspect of the invention a method for shielding a gamma radiation detector comprises surrounding the detector with a first shielding means for producing a gamma radiation flux when exposed to a thermal neutron flux, and surrounding said first shielding means with a second shielding means for effecting attenuation of the neutron flux reaching said first shielding means.

In another aspect the invention provides a radiation detector comprising detection means for detecting gamma radiation, first shielding means surrounding said detection means for producing a gamma radiation flux when exposed to a thermal neutron flux, second shielding means surrounding said first shielding means for effecting attenuation of the neutron flux reaching said first shielding means.

In practice the first shielding means may comprise the boron isotope $B^{10}$ and the second shielding means will comprise the lithium isotope $Li^6$ as the respective characteristics of these isotopes render them most suitable for the described purpose. However, it is within the scope of the invention to substitute other elements or isotopes which function in a similar manner and are compatible with the detection system as a whole.

The radiation detection means may be any suitable type of spectometric detection for gamma radiation, e.g. solid or liquid type scintillators with associated photoelectric detection systems, or solid state detection devices.

Physically, the two shields may consist of any suitable coating or structure containing, comprising or supporting the active shield components ($Li^6$ and $B^{10}$) and adapted to surround the detection means. Thus the shields may simply consist of cylindrical concentric sleeves or shells of a suitable base material containing the respective active components or they may consist of superimposed individual coatings containing the active components applied directly to the outside of the housing of the detection means. For example, the shields may each consist of a coating of a synthetic resin or plastics material containing respectively the nuclides $B^{10}$ and $Li^6$ in a suitable form. Epoxy-based synthetic resins such as the "Araldite" (registered Trade Mark) resins are particularly suitable coatings for this purpose.

Boron may be incorporated into such resins in the elemental form or as a suitable compound, preferably with a high boron context, e.g. boron carbide. As lithium is an active element, it will usually be necessary to use it in the form of a compound, for example, lithium carbonate or lithium fluoride.

In their naturally-occurring states, elemental boron contains about 18 percent of the $B^{10}$ nuclide and lithium about 7 percent of $Li^6$. While it is possible to utilize these naturally occurring isotopic mixtures, it is preferred to use artificially enriched forms of the elements which contain larger amounts of the desired isotopes. Enriched materials containing 95 percent or more of the $B^{10}$ or $Li^6$ nuclides are available commercially.

For borehole operation, it is usually desirable to shield radiation detection devices against mechanical shock and damage and for this purpose the device may be encased in a suitable resilient material. In accordance with another aspect of this invention therefore, at least the second shielding means consists of or comprises a resilient shell of a material containing the active component, e.g. $Li^6$ in suitable form.

Suitable resilient materials include synthetic rubbers and plastics materials, especially silicone rubbers.

The concentration of the active components required will depend on the requirements of the system, e.g. the neutron flux at the surface of the detector, the sensitivity of the detector and the required signal level for the 0.478 MeV line.

For borehole operations, involving detection of thermal neutrons of mean energy 0.025 eV, concentrations of 20 – 100 $mgm/cm^2$ of $B^{10}$ (commercial 95 percent grade) and 10 – 50 $mgm/cm^2$ of $Li^6CO_3$ (95 percent of Li as $Li^6$) have been found suitable. Preferred concentrations are respectively 50 and 20 $mgm/cm^2$ giving attenuations of respectively $e^{-11.5}$ and $e^{-1.85}$ (for 0.025 eV neutrons), i.e., a nett attenuation of $2 \times 10^{-6}$.

Difficulties may be encountered in obtaining precisely the desired amount of shielding, particularly in the case of the second shield. It is therefore a convenient measure and one which is within the scope of this invention to provide further shielding material of the first type outside the second shield to compensate for excess material in the second shield. Any excess of the additional material may be further compensated for by additional second shield material applied outside the third layer and so on.

Thus a typical shielded detector in accordance with this invention may consist of a gamma scintillation detector coated with a layer of epoxy resin ("Araldite") containing $B^{10}$ and surrounded by a moulded silicone rubber sleeve containing $Li^6CO_3$ which is further coated or "striped" with a thin layer of the $B^{10}$ – containing resin.

In some circumstances it may be desirable to monitor a neutron flux by utilizing a gamma ray spectral line other than that of $B^{10}$ at 0.478 MeV, e.g. where the $B^{10}$ line is interfered with by a line of an element under investigation. This may be achieved conveniently by providing a third shielding material outside the second shield again in the form of a thin coating, either continuous or discontinuous, e.g. a "stripe." Also, under some circumstances, annihilation radiation at 0.511 MeV may be of such intensity as to interfere with monitoring of the $B^{10}$ line at 0.478 MeV. Such interference can be conveniently overcome by substituting for the $B^{10}$ shield a similar shield containing about 600 $mg/cm^2$ of $Sm_2O_3$ and placing outside this shield a shield of suitable $Li^6$ compound as already described. In this manner a different neutron-monitoring line in the gamma ray spectrum from the detector may be obtained at 0.338 MeV. Since $Sm_2O_3$ gives a bulkier coating than $B^{10}$ the thickness of the shield will have to be increased to give equivalent reduction in flux.

Alternatively, the first $B^{10}$ shield may be left in place and a third shielding material provided outside the second shield in the form of a thin coating of $Sm_2O_3$ either continuous, or discontinuous, e.g. a "stripe." This coating, or striping, must be only just thick enough to produce the desired intensity of the 0.338 MeV line of samarium without introducing unwanted intensities of other radiative capture lines of samarium.

For the same reasons that samarium was substituted for $B^{10}$ gadolinium (which gives a suitable monitoring line at 0.187 MeV) or erbium (which gives suitable monitoring lines at 0.150 MeV and 0.186 MeV), may be substituted for samarium.

During irradiation the neutron source and detector are preferably situated coaxially in the bore-hole.

The question of interferences due to other elements may now be considered in detail. Such interferences can be caused by radiation from nuclides produced either from the fast neutron flux, or from the flux of thermal neutrons resulting from slowing down of fast neutrons by water in the surrounding rock, and not infrequently, in the bore-hole itself. The interfering radiation can result either from (a) scattering radiation resulting from absorption of higher energy gamma rays in the detector of (b) annihilation radiation produced by emitters other than $Cu^{62}$ and $Cu^{64}$, such as $Zn^{64}$ or $Zn^{63}$.

Interference due to higher energy gamma rays is removed by subtraction of the continuum radiation under the peak at 0.511 MeV after a suitable delay period as already discussed. Other nuclides likely to be present in copper ores, which give rise to positron-emitting nuclides, include $Zn^{64}$, $Ag^{107}$, $K^{39}$, $Ti^{46}$, $Fe^{54}$, $Cr^{50}$, and $Ni^{58}$. Of these most can be safely ignored because of their low spectral sensitivity due to a combination of low abundance and low cross-section.

Zinc however, may provide a source of interference if its concentration approaches that of copper. With a 14 MeV source of neutrons, interfering 0.511 MeV radiation arises from the reactions:

$$Zn^{64} (n, 2n) Zn^{63}$$

$$Zn^{64} (n, p) Cu^{64}$$

the products having the half-lives of 38 minutes and 12.8 hours respectively.

Most of the major copper deposits in Australia and elsewhere contain relatively little zinc and can be accurately logged by the method already proposed. There are, however, a few notable copper-zinc deposits that contain significant concentrations of zinc. In these situations recognition of an interference due to zinc is provided by an analysis of the decay curve of the 0.511 MeV peak. Such a decay need not be followed for more than 80 minutes, i.e., approximately two half-lives of the interfering nuclide $Zn^{63}$ and eight half-lives of $Cu^{62}$. Calculations for the logging conditions proposed in this work, and utilizing integrated cross-sections, indicate that 87 per cent of the two activities due to zinc is due to $Zn^{63}$, and only 13 per cent to the longer-lived $Cu^{64}$.

Moreover, in an ore containing equal amounts by weight of copper and zinc it can be shown that the component of the 0.511 MeV radiation due to interfering $Zn^{63}$ has only 8 per cent of the intensity of that due to $Cu^{62}$. Hence, if a logging error due to zinc which does not exceed more than 5 per cent of the total counts due to copper is permitted, it follows that the concentration of zinc should not exceed 57 per cent by weight of the copper present to be consistent with the established limit of precision of our measurements. However, for logging purposes, the method is still useful when up to 15 per cent of the total copper counts is contributed by zinc, that is, when the zinc concentration is up to 1.7 times that of copper. Once the leel of interference (if any) is established, it can often be regarded as constant, since our experience shows that the variation of the ratio of copper to zinc in such deposits is within the limits of accuracy of the logging method.

For those situations which reveal a count interference from zinc exceeding 5 per cent, a three-component decay curve analysis is required to obtain separately the intensities at 0.511 MeV of the radiation components due to $Cu^{62}$ and $Zn^{63}$.

Thus with the exception of zinc under the conditions defined, the method of the invention is virtually specific for copper and can be used with confidence as a logging technique. Strong absorption of thermal neutrons by cadmium in ores containing significant amounts of sphalerite does not affect the procedure unless the zinc content of the ore approaches the limits defined.

The method is even simpler to apply in a copper-rich lode, poor in elements such as silicon and aluminium, since these are the elements giving rise (by $n,p$ reactions) to the interfering nuclides $Mg^{27}$ and $Al^{28}$. In such a lode the delay of 10 minutes proposed for logging of porphyry-types ores could be substantially reduced.

The following Examples illustrate the basis and practice of the invention, but are to be understood as not limiting thereon.

BORE-HOLE MODELS

Since no bore-holes in copper-bearing orebodies were situated near the laboratory, suitable holes were simulated in experimental rigs. A copper-bearing concrete casting 50 cm by 46 cm by 94 cm long, and weighing about 500 kg in the air-dried state was mounted symmetrically in the centre of cubic array of concrete blocks measuring 210 cm on a side. The array was constructed using several sizes of close-fitting basalt aggregate concrete bricks in such a way that all cracks between bricks were staggered to minimize escape of neutrons. A cast "bore-hole" 7.5 cm in diameter ran through the long dimension of the casting, entering and emerging at opposite face-centres of the cubic array. "Copper-bearing ore" thus extended for about 20 cm each side of the bore-hole. Outside of this zone the basalt aggregate concrete extended radially for at least 80 cm.

The densities of the castings, after air-drying to constant weight, were between 2.4 and 2.7 g/cc depending on copper content. In the case of one casting, a copper content of 3.75 per cent was achieved by adding powdered metal. For the other castings an analysed chalcopyrite concentrate supplied by Cobar Mines Pty. Ltd. of New South Wales was used. The overall composition of one such casting containing 1.05 per cent copper is shown in Table 1. Tests showed the distribution of copper to be uniform. Other castings contained 0.53 and 1.98 per cent copper respectively.

Two iron-containing castings which contained no added copper were made. These contained 6.7 per cent and 14.6 per cent respectively of iron metal, compared with the 4.4. per cent iron present in an ordinary concrete casting (see Table 1) and the 6.7 percent present in the copper-containing sample specified in Table 1. Some of the added iron was present as haematite and some as pyrite, so that these castings also realistically simulated a mineralised zone barren of copper but containing magnetite and pyrite.

TABLE 1

| Element | % in Copper-containing Casting | % in Copper-free Casting |
|---|---|---|
| Cu | 1.05 | — |
| Zn | 0.21 | — |
| Fe | 6.7 | 4.4 |
| S | 1.7 | — |
| Si | 29 | 30 |
| Ca | 6.0 | 7.0 |
| Mg | 3.0 | 3.1 |
| Al | 4.0 | 4.1 |
| K | 1.0 | 1.0 |
| Ma | 1.0 | 1.0 |
| H | 0.3* | 0.3* |
| O | 46 | 49 |

*Total water = 3%.

Aggregate and sand for all castings was drawn from a common stockpile.

EQUIPMENT

The detector used for gamma spectroscopy was a 50 mm × 50 mm NaI (Tl) crystal optically coupled to an EMI 9656 R phototube and located in a thin aluminium-magnesium alloy housing. Linearity of response over the range 0–10 MeV was obtained by suitable choice of dynode resistors and operating voltage. Spectral resolution (FWHM), which was somewhat better than 8 per cent for $Cs^{137}$ (P/V for $Co^{60}$ approximately 5/1), was uniform over the bulk of the crystal and independent of the direction of the incident gamma radiation. This spectral performance was achieved with the detector and its preamplifier and "cable-driver" at the end of a cable 35 metres long connecting it to electronic equipment located in the laboratory.

The neutron source for all work was a Philips Model PW 5301/10 D.T. accelerator tube operated at a continuous output of $10^8$ n/s by adjusting the target current to 100 microamp at an accelerating voltage of 120 KV. To achieve better regulation of the neutron output manual adjustment of the deuterium replenisher current and iron source voltage was preferred to electronic methods for stabilisation of the output.

All spectra were obtained on an RIDL 400-channel pulse height analyser provided with a Canberra Industries digital spectrum stabiliser to compensate for gain changes of a detector operated (in contrast to the analyser) in an environment subject to temperature drifts and fluctuations.

Output facilities of the analyser included a printer for quantitative work and, for preliminary assessment of the activation situation, a magnetic tape output which enabled the memory content of 400 channels to be 'dumped' from the analyser in approximately 5 seconds, thus automatically releasing the analyser memory for accumulation of further spectral data.

For activation work the prominent aluminium photopeak at 1.78 MeV was of adequate intensity for stabilisation and energy calibration. Preliminary calibration and set-up of the channel zero was conveniently carried out in the usual manner, e.g. with the photopeaks of $Cs^{137}$ (0.662 MeV), and $Y^{88}$ (0.899 and 1.84 MeV respectively).

EXAMPLE 1

The laboratory procedure described in this example is the same in principle as that for operation of a logging tool in actual bore-hole operations.

With the neutron tube situation coaxially in the borehole and with its target area situated centrally with respect to the length of the casting, the latter was irradiated with 14 MeV neutrons at an output of $10^8$ $n/s$ for a selected period, usually 20 minutes (i.e., about twice the half-life for $Cu^{62}$). For preliminary assessment of the spectral situation the detector was then inserted into the hole and quickly pushed along it until the scintillator was located in the position originally occupied by the neutron generator target. The detector was centred in the hole to simulate actual field conditions. For the preliminary work, commencement of accumulation of consecutive spectra, each for 2 minutes lifetime, began as soon as possible after irradiation. For quantitative evaluation of the heights of the peak at 0.511 MeV a fixed delay of 10 minutes preceded onset of spectrum accumulation for a fixed period of 4 minutes livetime. Deadtime, fairly constant for all samples was such that the means clocktime was approximately 5.5 ± 0.2 minutes. Peak centroid height at 0.511 MeV was then measured above a value of the spectral continuum at this point estimated by linear interpolation as will be described hereinafter.

FIG. 1 shows the spectra (on a linear-linear scale) obtained by the above-described procedures from a casting containing 2 per cent copper, for each of four consecutive 2-minute-livetime intervals commencing immediately after irradiation for 20 minutes with 14 MeV neutrons.

FIG. 2 shows the spectra (on a log.-linear scale) obtained from a casting containing 2 percent copper after irradiation for 20 minutes with 14 MeV neutrons. Every alternate recording has been omitted for clarity.

The spectra show the principal nuclides produced by fast neutron irradiation. It will be seen that the photopeak at 0.511 MeV due to positron annihilation is the strongest contributor to the various spectra, followed closely at initial stages of the decay by the photopeak of 2.3 min $Al^{28}$ at 1.78 MeV. This nuclide is formed mainly from $Si^{28}$ by an $n, p$ reaction. The 9.45 min. nuclide $Mg^{27}$ formed from $Al^{27}$ by an $n,p$ reaction is also a significant contributor to the spectrum, with photopeaks at 0.84 and 1.02 MeV respectively. The latter overlaps the weak photopeak at 1.04 MeV of 5.1 min $Cu^{66}$ formed by thermal neutron activation of $Cu^{65}$.

A plot of peak height against time reveals that there are two principal activities contributing to the peak at 0.511 MeV, viz. a 9.7 min activity due to $Cu^{62}$, formed from $Cu^{63}$ by an $n,2n$ reaction; and a 12.8 hr. activity due to $Cu^{64}$, formed from $Cu^{63}$ by activation with thermal neutrons and from $Cu^{65}$ by an $n,2n$ reaction with fast neutrons.

Since the peak at 0.511 MeV is by far the strongest peak of copper, and since the nuclides $Cu^{62}$ and $Cu^{64}$ are the only significant contributors to the spectrum at this energy in copper ores containing small proportions of zinc, peak area or peak height suitably calculated should be directly related to the copper concentration.

Such a calculation requires that an allowance be made for counts due to the radiation continuum under the peak. Although Bremsstrahlung radiation also contributes, this continuum is largely a summation of all Compton-scattered gamma rays resulting from absorption of higher energy gamma radiation, both in the scintillator itself, and in all materials surrounding it.

Because of this continuum sensitivity of detection for copper is clearly increased by first allowing major contributors to the continuum, such as $Al^{28}$, to decay as much as possible whilst allowing as little as possible the $Cu^{62}$ to decay. The delay of ten minutes adopted represents decay periods of approximately $1T$, $2T$ and $5T$ 9 for $Cu^{62}$, $Cu^{66}$ and $Al^{28}$ respectively, during which periods the contributions of these emitters are reduced to 50, 25 and 3 per cent respectively of their original values, the contribution of $Cu^{64}$ changing only slightly.

Next, the height of the peak at 05.11 MeV may be calculated on the assumption that the continuum covering the same energy range as the pulse height distribution for a monoenergetic gamma ray is approximately a straight line connecting two selected points (i.e., channels of the analyser). The first known point is the minimum on the low energy side of the peak at 0.511 MeV. The other known point is one on the high energy side of the peak calculated to be one channel beyond the $3\sigma$ point, where $\sigma=FWHM/2.36$ for the pulse height distribution, assuming the peak to be near-Gaussian in shape. (FWHM = full width half maximum of the pulse height distributed response to a monoenergetic excitation). For such calculations it was assumed that the resolution of the detector at 0.511 MeV was not inferior to 9.0 per cent FWHM. At our calibration of 7.5 KeV/channel used for quantitative investigations, this places the $3\sigma$ point in question at eight channels beyond the peak of the pulse height distribution, but we have found, however, that it is not critical whether this point is placed at seven, eight or nine channels beyond the peak. As the counting statistics are adequate, it was found to be quite satisfactory for our purposes to take, as a measure of the gamma ray intensity at 0.511 MeV, the corrected height of the peak, i.e., the difference between the total counts in the peak channel and the calculated counts in the spectral continuum at the same channel number. Since detector resolution is constant at a given energy, corrected peak height is proportional to peak area.

Finally the calculation is completed by normalising the raw count data to a constant flux of neutrons. This is desirable because of possible variations in output of the neutron tube and is essential to cope with variations of the neutron flux such as those which might be encountered in the field due to changes in water concentration, and other parameters in the formations logged.

In the present instance the flux was monitored by summing the counts under the photopeak of $Na^{24}$ (2.75 MeV) for 16 minutes by the method of Covell (*Anal. Chem.* 31, 1,785). This procedure is valid because $Na^{24}$ is produced from $Na^{23}$, $Al^{27}$ and $Mg^{24}$ and errors due to variation in concentration of these nuclides in the casting are not significant compared with errors introduced from other sources such as counting statistics. In actual field equipment, normalisation date would be derived from the count of a neutron monitor built into the logging sonde.

The results from the activation analysis were compared with the values obtained by chemical analysis by the method of least squares.

A comparison of chemically assayed results with the fitted results is provided in Table 2. Considering the large number of factors involved there is very satisfactory agreement between the fitted results from fast neutron activation and the results of chemical analysis. This is because the relationship between the "as-measured" peak intensity and copper content is essentially linear over the range studied.

TABLE 2

Copper Content of Samples

| Estimated least squares fitted value, % copper | Value determined by chemical analysis, % copper |
|---|---|
| 0.52 | 0.53 |
| 1.11 | 1.04 |
| 1.86 | 1.98 |
| 3.79 | 3.76 |

EXAMPLE 2

In the following description the gamma ray scintillation detector consisted of a 50 mm × 50 mm sodium iodide crystal optically coupled to an EMI 9656R phototube, both components being housed in a thin aluminium-magnesium alloy case measuring 50 mm in diameter and 185 mm in length.

The outside of the case was coated with a layer of "Araldite" (registered Trade Mark) epoxy resin containing 20 percent by weight of 92 – 95 percent grade commercial boron-10, sufficient to give a loading of 50 mgm/cm² of $B^{10}$ over the surface of the casing.

After drying the casing was then coated with a silicone rubber (manufactured by Midland Silicones Ltd. under the name "Silastic 583 RTV") and containing 20 percent by weight of $Li^6CO_3$ (Commercial grade; 96 percent Li as $Li^6$) and sufficient to give a loading of 20 mgm/cm² of $Li^6$ over the surface. The coating was allowed to cure.

We claim:

1. A method for the detection and estimation of copper in an ore body, which comprises detecting and measuring the 0.511 MeV peak in gamma radiation emitted from the body, due to the annihilation of positrons emitted by $Cu^{62}$ therein.

2. A method as claimed in claim 1, and including the steps of irradiating the body with a flux of fast neutrons having an energy of at least 12 MeV, thereby to bring about the transformation of $Cu^{63}$ to $Cu^{62}$; and discontinuing said irradiation before detecting the 0.511 MeV peak in the said gamma radiation.

3. A method as claimed in claim 2 wherein the neutrons are provided by a source having an intensity of at least $10^8$ n/s.

4. A method as claimed in claim 2 wherein the body is irradiated for at least about 20 minutes.

5. A method as claimed in claim 2 wherein following irradiation, detection and measurement of the said gamma radiation is delayed for about 10 minutes to allow the decay of interfering isotopes to a lower level of activity.

6. A method as claimed in claim 2 wherein detection and measurement of the 0.511 MeV peak is carried out by determining the energy spectrum of the gamma radiation, selecting and measuring the 0.511 MeV peak in the spectrum after subtracting the background spectral continuum from said peak, to give a net value for the height of the peak which is a function of total copper present in the body.

7. A method as claimed in claim 6, wherein the energy spectrum is determined by producing electrical pulses having amplitudes related to the energy of the gamma rays detected, segregating said pulses into channels according to the energies of the corresponding gamma rays, and accumulating a count of the number of pulses in the channel corresponding to 0.511 MeV gamma rays and subtracting from said count the calculated accumulated number of counts attributable to the background spectral continuum.

8. A method for the detection and estimation of copper in an ore body, which comprises irradiating the body with a flux of fast neutrons having an energy of at least 12 MeV, thereby to bring about the transformation of $Cu^{63}$ to $Cu^{62}$; discontinuing said irradiation; and detecting and measuring the 0.511 MeV peak in the gamma radiation emitted from the body, due to the annihilation of positrons emitted by the $Cu^{62}$ therein, thereby to give an indication of the total copper present in the body.

9. Apparatus for the detection and estimation of copper in an ore body which comprises means for detecting and measuring the 0.511 MeV peak in gamma radiation emitted from the body due to the annihilation of positrons emitted by $Cu^{62}$ therein including a radiation detector, said radiation detector comprising detection means for detecting gamma radiation, first shielding means surrounding said detection means for producing a gamma radiation flux when exposed to a thermal neutron flux and second shielding means surrounding said first shielding means for effecting attenuation of the neutron flux reaching said first shielding means wherein the first shielding means comprises 20 to 100 mgm/cm² of commercial grade (about 95 percent $B^{10}$ and the second shielding means comprises 10 to 50 mgm/cm² of lithium carbonate in which about 95 percent of the lithium is $Li^6$.

10. Apparatus for the detection and estimation of copper in an ore body which comprises means for detecting and measuring the 0.511 MeV peak in gamma radiation emitted from the body due to the annihilation of positrons emitted by $Cu^{62}$ therein including a radiation detector, said radiation detector comprising detection means for detecting gamma radiation, first shielding means surrounding said detection means for producing a gamma radiation flux when exposed to a thermal neutron flux and second shielding means surrounding said first shielding means for effecting attenuation of the neutron flux reaching said first shielding means wherein the second shielding means is partly surrounded by a third shielding means containing a further shielding material which produces a gamma radiation flux when exposed to thermal neutrons.

11. Apparatus as claimed in claim 10, wherein the said further shielding material is or contains $B^{10}$, Sm, Gd or Er.

12. A radiation detector, comprising detection means for detecting gamma radiation, first shielding means surrounding said detection means comprising 20 to 100 mgm/cm² of commercial grade $B^{10}$ for producing a gamma radiation flux when exposed to a thermal neutron flux, second shielding means surrounding said first shielding means comprising 10 to 50 mgm/cm² of lithium carbonate in which about 95 percent of the lithium is $Li^6$ for effecting attenuation of the neutron flux reaching said first shielding means.

13. A detector as claimed in claim 12, wherein the second shielding means is partly surrounded by a third shielding means containing a further shielding material which produces a gamma radiation flux when exposed to thermal neutrons.

14. A detector as claimed in claim 13, wherein the said further shielding material is or contains $B^{10}$, Sm Gd or Er.

15. A detector as claimed in claim 12, wherein the shields each consist of a coating of a synthetic resin or plastics material containing the shielding substance.

* * * * *

UNITED STATES PATENT OFFICE
CERTIFICATE OF CORRECTION

Patent No. 3,792,253　　　　　　　　　Dated　February 12, 1974

Inventor(s) Alan Wilson Wylie et al

It is certified that error appears in the above-identified patent and that said Letters Patent are hereby corrected as shown below:

On page 1, under the heading of Foreign Application Priority Data, please change "2447/70" to --2647/70--.

Signed and sealed this 30th day of July 1974.

(SEAL)
Attest:

McCOY M. GIBSON, JR.　　　　　　　　C. MARSHALL DANN
Attesting Officer　　　　　　　　　　Commissioner of Patents